(12) United States Patent
Schröter

(10) Patent No.: US 9,075,147 B2
(45) Date of Patent: Jul. 7, 2015

(54) CIRCUIT ARRANGEMENT FOR A DIRECTLY CONVERTING DETECTOR AND LIKEWISE THE USE THEREOF AND A METHOD FOR READING A DIRECTLY CONVERTING DETECTOR

(75) Inventor: Christian Schröter, Bamberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 354 days.

(21) Appl. No.: 13/420,903

(22) Filed: Mar. 15, 2012

(65) Prior Publication Data

US 2012/0236986 A1 Sep. 20, 2012

(30) Foreign Application Priority Data

Mar. 16, 2011 (DE) .......................... 10 2011 005 604

(51) Int. Cl.
*G01T 1/17* (2006.01)
*A61B 6/03* (2006.01)
*G01T 1/24* (2006.01)

(52) U.S. Cl.
CPC ................. *G01T 1/171* (2013.01); *G01T 1/247* (2013.01)

(58) Field of Classification Search
CPC ................................. G01T 1/171; G01T 1/247
USPC .................. 378/5, 19, 98.8, 98.9; 250/370.09
See application file for complete search history.

(56) References Cited

U.S. PATENT DOCUMENTS

| 2005/0123090 | A1* | 6/2005 | Heismann et al. ............... 378/19 |
| 2007/0051893 | A1 | 3/2007 | Matsumoto |
| 2008/0018505 | A1* | 1/2008 | Astley et al. .................... 341/51 |
| 2008/0149842 | A1 | 6/2008 | El-Hanany |
| 2010/0189212 | A1* | 7/2010 | Zou ..................................... 378/5 |
| 2010/0193700 | A1* | 8/2010 | Herrmann et al. ............ 250/395 |

FOREIGN PATENT DOCUMENTS

| CN | 101110157 A | 1/2008 |
| DE | 102007033671 A1 | 1/2008 |
| WO | WO 2008146218 A2 | 12/2008 |

OTHER PUBLICATIONS

German Priority document for German Application No. DE 10 2011 005 604.1. Published on Sep. 20, 2012.

\* cited by examiner

*Primary Examiner* — Glen Kao
(74) *Attorney, Agent, or Firm* — Harness, Dickey & Pierce, P.L.C.

(57) ABSTRACT

A circuit arrangement is disclosed for a detector. In at least one embodiment, the circuit arrangement includes a directly-converting semi-conductor material and pulse-shaper in the signal readout electronics assembly. A method is disclosed for a readout of count impulses generated in the semi-conductor material, wherein part of the pulse-shaper is equipped with a relatively longer shaping time constant and a different part of the pulse-shaper is equipped with a relatively shorter shaping time constant.

33 Claims, 6 Drawing Sheets

CIRCUIT ARRANGEMENT FOR A DIRECTLY CONVERTING DETECTOR AND LIKEWISE THE USE THEREOF AND A METHOD FOR READING A DIRECTLY CONVERTING DETECTOR

PRIORITY STATEMENT

The present application hereby claims priority under 35 U.S.C. §119 to German patent application number DE 10 2011 005 604.1 filed Mar. 16, 2011, the entire contents of which are hereby incorporated herein by reference.

FIELD

At least one embodiment of the invention generally relates to a circuit arrangement for a directly converting detector for ionizing radiation. In at least one embodiment, it relates to a circuit arrangement for a detector in a CT system, comprising a plurality of radiation-sensitive partial surfaces, wherein a directly converting semi-conductor material is provided as a radiation-sensitive material and a dedicated readout electronics assembly that reads this sub-area individually is assigned to each sub-area, the readout electronics assembly comprising in each case a pulse-shaper to homogenize the electronic signals that have been detected. At least one embodiment of the invention further generally relates to a method for reading detector elements pertaining to a directly converting detector for ionizing radiation, in particular in a CT system.

BACKGROUND

The use of pulse-shapers in the evaluation electronics of detectors for ionizing radiation, in particular for detectors of CT systems, is generally known.

It is also known that the shaping time constant can be modifiably adjusted in order to adapt to the photon flux density that is present and thus reduce detector drift. However, such a variable adjustment does not always lead to the desired objective of avoiding radiation intensity-related detector drift.

SUMMARY

At least one embodiment invention is directed to a circuit arrangement for a directly converting detector for ionizing radiation and/or a method for reading detector elements of a directly converting detector, which arrangement allows extensive avoidance or correction of detector drift.

Advantageous variants of the invention form the subject of the sub-claims.

Accordingly, in at least one embodiment of the invention, the inventor proposes a circuit arrangement for a detector for ionizing radiation, in particular for a detector in a CT system, comprising a plurality of radiation-sensitive sub-areas, wherein a directly converting semi-conductor material is provided as a radiation-sensitive material and a dedicated readout electronics assembly that reads this sub-area individually is assigned to each sub-area, which readout electronics assembly comprises in each case a pulse-shaper, part of said pulse-shaper being equipped with a longer shaping time constant and part being equipped with a shorter shaping time constant.

In addition to the circuit arrangements described in the aforementioned, a method is also disclosed in at least one embodiment for the reading of detector elements pertaining to a directly converting detector for ionizing radiation, in particular for a CT system, wherein:

each detector element, measuring in each case one beam in total, is divided up into at least two separately detectable sub-areas, a dedicated measurement electronics assembly with a pulse-shaper being assigned to each sub-area, which shaper in each case converts the same charge amounts of a signal, irrespective of the shape and level of the signal curve generated by the charge amount, into signals of the same level and shape, and in each detector element, at least one sub-area comprising a pulse-shaper with a longer shaping time constant and at least one sub-area comprising a pulse-shaper with a shorter shaping time constant is detected.

BRIEF DESCRIPTION OF THE DRAWINGS

Example embodiments of the invention will be described in more detail hereinafter, not to be understood in a limiting sense, with the aid of the drawings, wherein only the features necessary for the understanding of embodiments of the invention being shown.

The following reference signs are used: C1: Dual-Source-CT-System; C2: first X-ray tube; C3: first detector; C4: second X-ray tube; C5: second detector; C6: gantry housing; C8: patient's couch; C9: system axis; C10: computer system; C11: contrast applicator; D: detector element; E: counter result; K: continuous applicator pulse level discriminator; L: logic element; P: patient; Prg1-Prgn: computer programs; S: pulse-shaper; S1.1: signal amplifier; S1.2: signal shaping with a shorter shaping time constant; S1.3: signal counting; S1.4: correction; S2.1: signal amplification; S2.2: signal shaping with a longer shaping time constant; S2.3: signal shaping; S3: signal combination and calibration; S4: output of measured value; T: pulsed pulse level discriminator; T1: sub-area with a shorter time constant; T2: sub-area with a longer time constant; V: amplifier; 1: curve showing values for the ideal count rate; 2: curve showing values for the count rate with a short shaping time constant; 3: curve showing values for the count rate with a long shaping time constant; I, II: electronic readout/counter unit:

The individual figures show:

Figure 1:
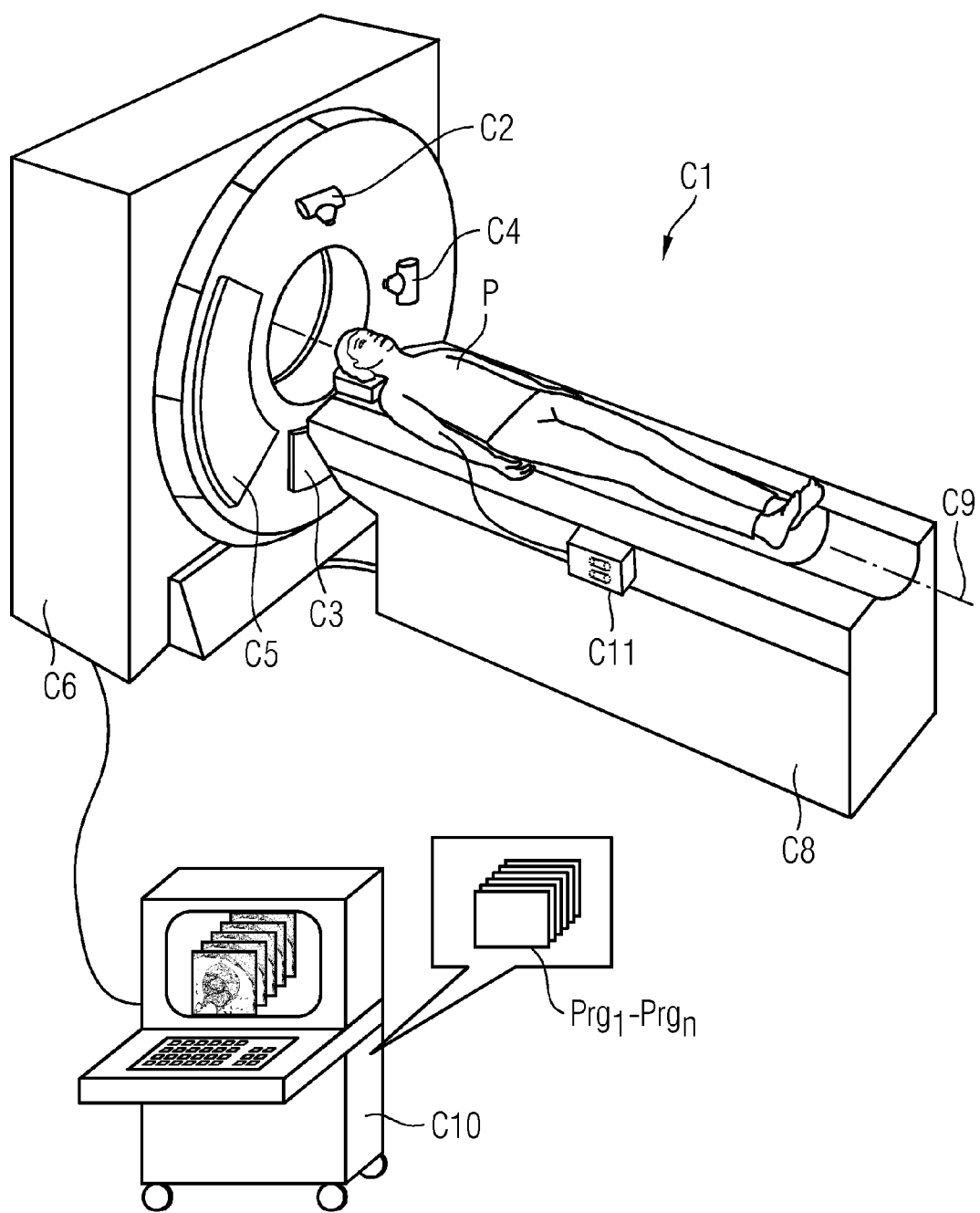
Figure 2:
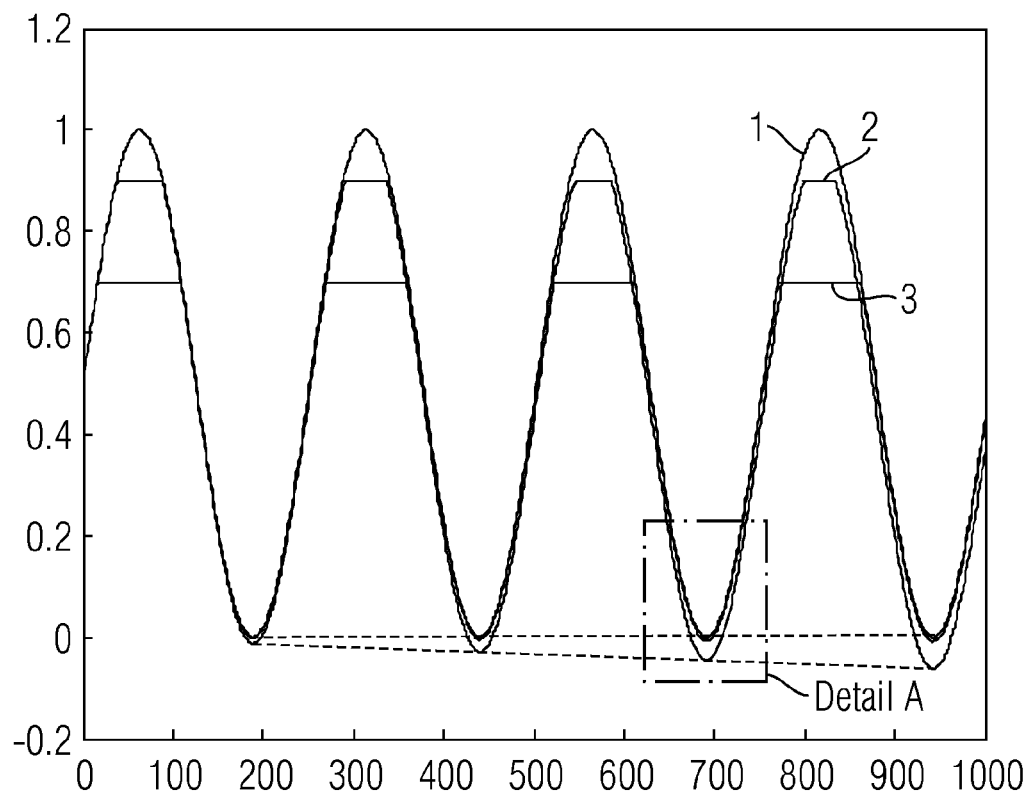
Figure 3:
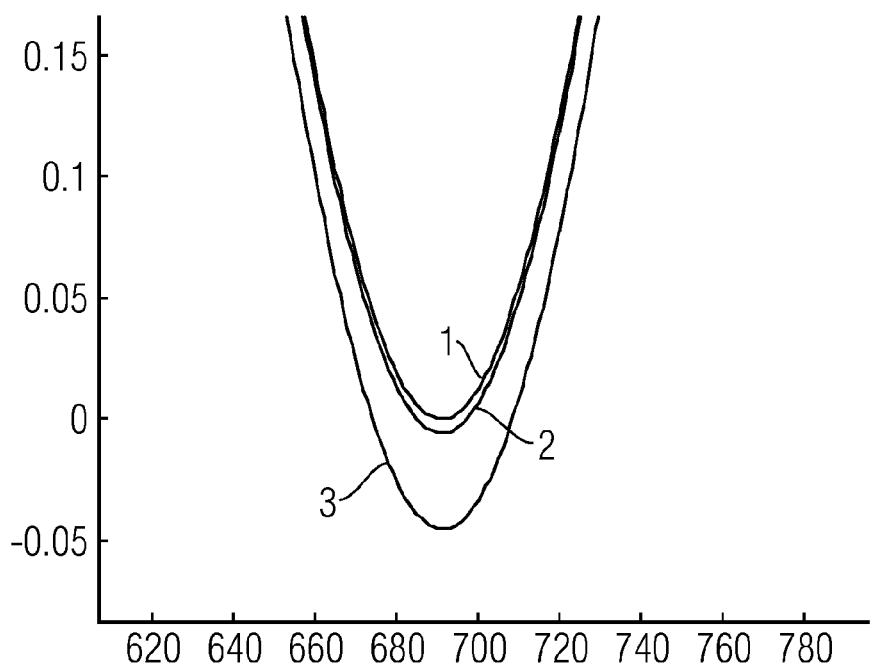
Figure 4:
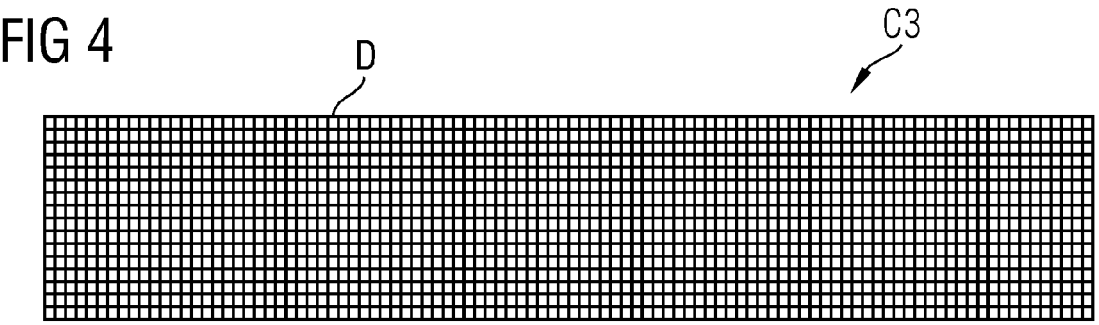
Figure 13:
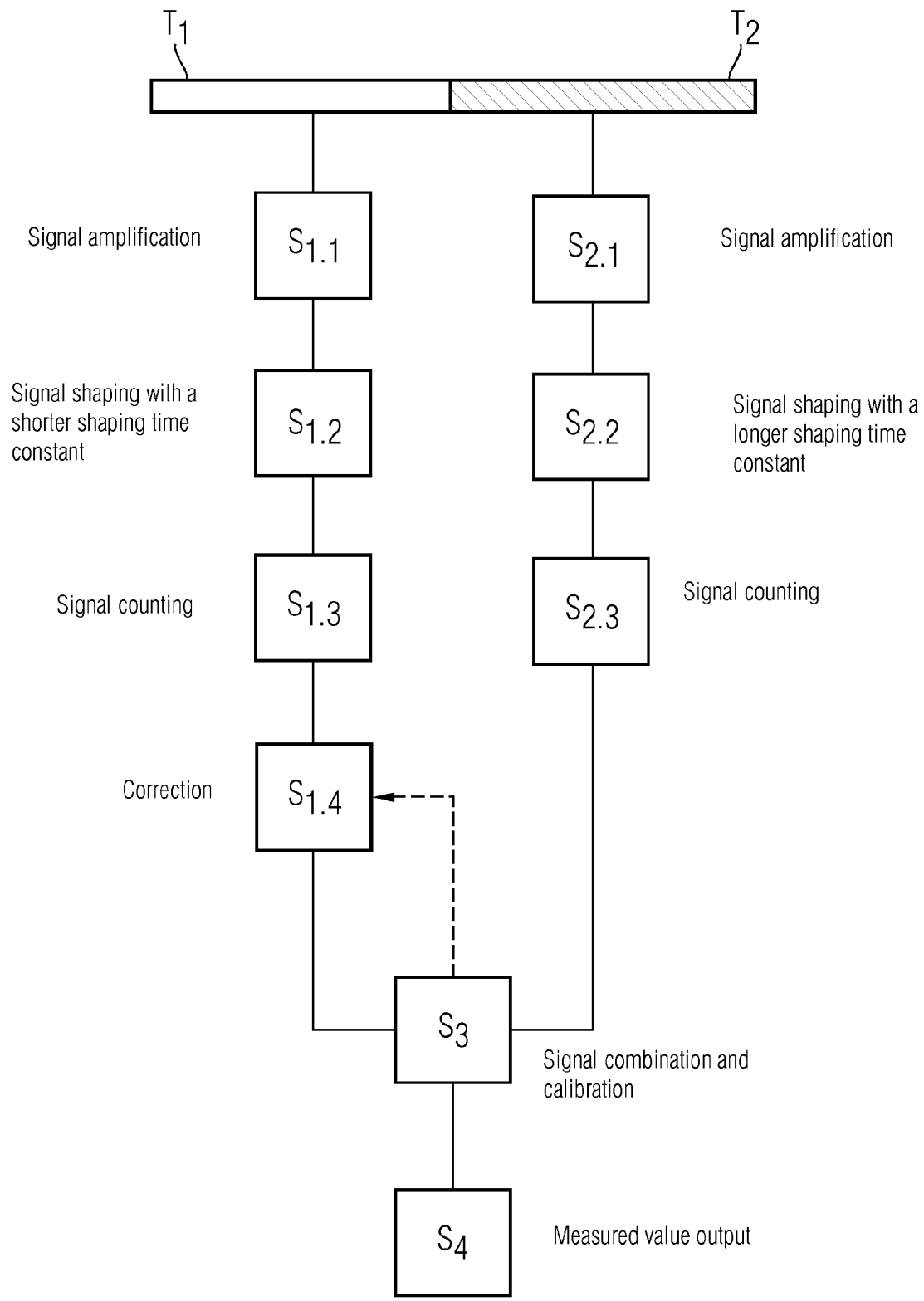
Figure 14:
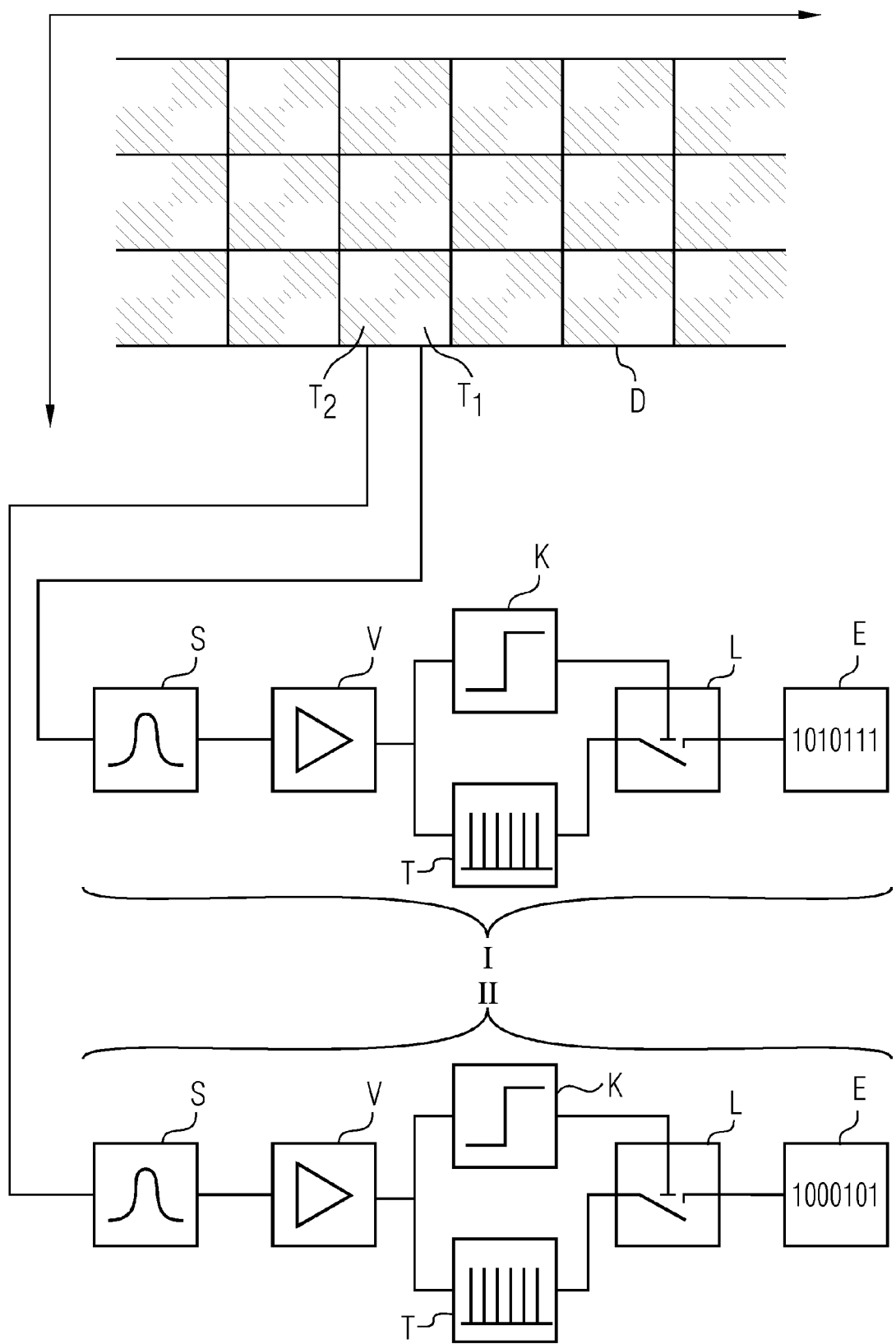
Figure 15:
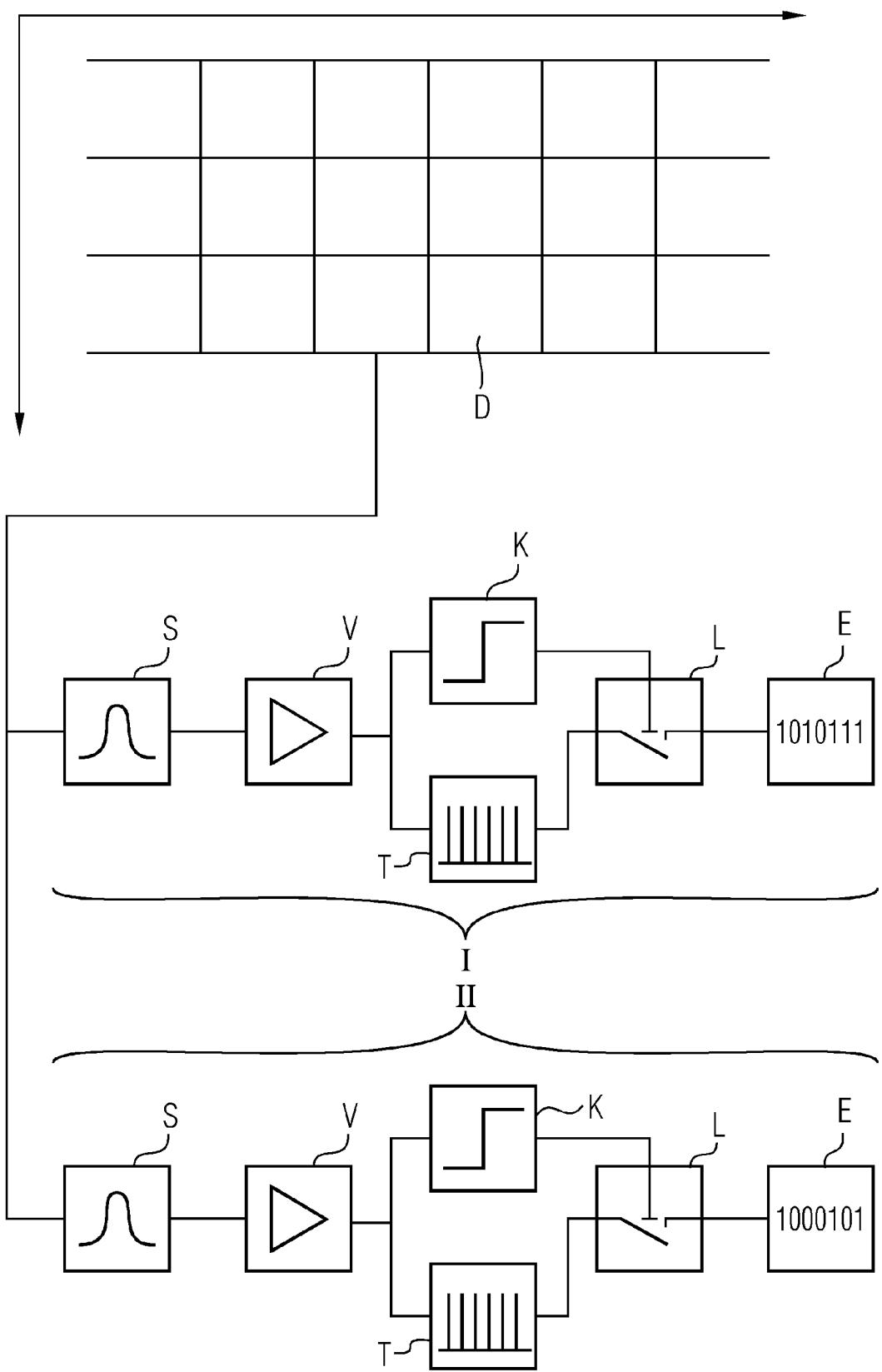

FIG. 1 a dual-source CT system,

FIG. 2 a diagrammatic view of a sinogram for a pixel in a CT detector,

FIG. 3 a detail from FIG. 2,

FIG. 4 a multi-line detector comprising detector elements,

FIG. 5-12 for each figure, one detector element having a plurality of sub-areas sub-divided in various ways, FIG. 13 a diagram of a process curve according to an embodiment of the invention, FIG. 14 a circuit arrangement of the detector with detector elements subdivided into sub-areas and separately assigned detector electronics assemblies with a different shaping time constant and FIG. 15 a circuit arrangement of the detector with parallel detector elements connected to two detector electronics assemblies units with different shaping time constants—not subdivided into sub-areas.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

At least one embodiment invention is directed to a circuit arrangement for a directly converting detector for ionizing radiation and/or a method for reading detector elements of a directly converting detector, which arrangement allows extensive avoidance or correction of detector drift.

Detectors used for the detection of gamma- and X-ray radiation, in particular in the case of CT and Dual Energy CT, include inter alia direct converting detectors based on semiconductive materials, such as, for example, CdTe, CdZnTe, CdZnTeSe, CdTeSe, CdMnTe, InP, TlBr2 or HgI2. In these detectors, individual X-ray quanta are counted instead of an integrated signal. The measured value that contributes to image generation is, therefore, a count rate. The count rate is determined by an electronics unit that always detects an event if the electrical pulse released by the X-ray quanta exceeds a certain threshold value. The level of this threshold value can be calibrated to X-ray energies and is therefore typically quoted in keV.

What the above materials have in common is the occurrence of polarization, in particular at a flux density necessary for CT devices. This is due to an increasing occupation of imperfections under flux and hence to a change in the internal electric field. This therefore leads to a change in the shape of the pulse and hence to a change in the amplitude of the electrical pulse that was initiated by an incident X-ray quantum.

Therefore, in a polarized state, some pulses fall below or exceed a pre-established threshold value and therefore generate no, or an additional counting event. This therefore leads to a change in the measured signal due to polarization. This phenomenon is known as detector drift.

In imaging, such a detector drift leads to various image artifacts and quantitative measurement is no longer possible. A "pulse-shaper" is typically used in the electronic count cells in which the electrical pulses have been detected. This pulse-shaper depicts pulse areas of the original, intrinsic pulses on pulse peaks. The pulse areas contain rather interesting information about the amount of charge that is proportional to the energy of the detected X-ray quanta. With the aid of the pulse-shaper, these energies can be detected in a simple manner by using a comparator threshold since the energy information, that is, the amount of energy released, is in fact reproduced by a pulse-shaper by means of the pulse peak after the throughput of a signal.

This transformation of the input signal into signal peaks by the pulse-shaper will improve, the longer the shaping time constant is. The problem with selecting an extremely long pulse constant is that, in computed tomography, extremely dense pulse sequences have to be detected. If the pulses become too long there is increased superimposition of the pulses, which paralyzes detectors. The longer the shaping time constant, the earlier paralysis occurs. Therefore, in applications involving dense pulse sequences, it is more usual to select short shaping time constants, as a result of which, however, there is an increase in electronic noise, the energy resolution is reduced and a high level of detector drift is generated.

The inventor has become aware that it is possible to construct each counter cell from two sub-cells, each sub-cell containing a pulse-shaper and at least one comparator threshold. At least one pulse-shaper in this arrangement needs to have a long shaping time constant, so that this constant can be used for a sub-cell in the case of a low flux, that is, in the case of a high level of absorption in a CT examination, and the other sub-cell needs to have a pulse-shaper with a short shaping time constant and thus provide a good test signal in the case of a high flux, that is, of low absorption in the CT scan.

It is consequently possible below a specific threshold value for the detected count rate, that is, in the area in which no paralysis yet occurs in the case of the long shaping time constant, for the signal for the sub-cell with the long shaping time constant to be used for image generation. This signal is virtually drift-free and shows a good energy resolution, resulting in a high multi-energy contrast. Above the threshold value, the sub-cell with the short shaping time constant can be used although it exhibits greater drift and a lower energy resolution, but is capable of a high flux due to the fact that paralysis occurs at a later stage.

In the context of at least one embodiment of the invention, a counter cell is equivalent to a detector element that detects a single X-ray beam when scanning an object. Thus the area that a beam scans during a reading is subdivided into at least two sub-areas. In the context of at least one embodiment of the invention it is indeed also possible for there to be a more extensive sub-division into a plurality of sub-areas, for example, 2×2, 3×2, 3×3, 3×4 or 4×4 and so forth, the total number of sub-areas for a detector element being subdivided into sub-areas with a longer or a shorter shaping time constant. If more than two sub-areas are used, it is further possible within a group with the same shaping time constant for there to be a subdivision into sub-groups with a different number of comparator thresholds in order to improve the energy resolution at least partially.

Since areas of high absorption in which the event of low flux occurs are traversed repeatedly during a CT scan, it is possible at these points by reconciling the count rate for the sub-cells, for the fast sub-cell in which there is greater drift to be corrected repeatedly within a scan using the signal from the slow cell as a calibration signal.

Accordingly, in at least one embodiment of the invention, the inventor proposes a circuit arrangement for a detector for ionizing radiation, in particular for a detector in a CT system, comprising a plurality of radiation-sensitive sub-areas, wherein a directly converting semi-conductor material is provided as a radiation-sensitive material and a dedicated readout electronics assembly that reads this sub-area individually is assigned to each sub-area, which readout electronics assembly comprises in each case a pulse-shaper, part of said pulse-shaper being equipped with a longer shaping time constant and part being equipped with a shorter shaping time constant.

It is advantageous in the above circuit arrangement if a plurality of detector elements distributed over a two-dimensional surface of the detector are provided, each detector element being designed to measure a beam, and each detector element being subdivided into at least two radiation-sensitive sub-areas, wherein at least one sub-area within each detector element is equipped with a pulse-shaper that has a longer shaping time constant and at least one sub-area is equipped with a pulse-shaper that has a shorter shaping time constant.

It is favorable in the above arrangement if the detector elements are designed and subdivided such that each element comprises a plurality of sub-areas, the number of sub-areas with a longer shaping time constant being equal to the number of sub-areas with a shorter shaping time constant at +/−1.

Moreover, all the sub-areas and likewise all the detector elements should be the same size.

Furthermore, the output signal received from the detector material can be transmitted to the pulse-shaper via an amplification step.

Likewise, at least one discrete counter can be arranged downstream of the pulse-shaper.

It is likewise disclosed that the circuit arrangement is arranged in a detector for a CT system and that a calibration circuit is provided, said circuit being designed such that, during a scan, a calibration is carried out in the detector elements that have photon flux rates that are at least intermittently below a predetermined value, by correcting the measured values from the sub-areas that have a short shaping time constant on the basis of the measured values for the sub-areas that have a long shaping time constant.

Moreover, for optimum exploitation of the dose that has been applied, in each case all the measured values from the sub-areas with a short shaping time constant and in each case all the measured values from the sub-areas with a long shaping time constant, relating to one detector element in each case, are added together.

Finally, a circuit arrangement for a detector is also disclosed, wherein individual detector elements are formed in each case by the sub-areas, each detector element being designed to measure a beam and each detector element having at least one pulse-shaper that has a longer shaping time constant and being combined with at least one pulse-shaper that has a shorter shaping time constant. Therefore, in this configuration, the total surface of each detector element can be read in parallel by at least two electronic counter units with different shaping time constants.

In addition to the circuit arrangements described in the aforementioned, a method is also disclosed in at least one embodiment for the reading of detector elements pertaining to a directly converting detector for ionizing radiation, in particular for a CT system, wherein:

each detector element, measuring in each case one beam in total, is divided up into at least two separately detectable sub-areas, a dedicated measurement electronics assembly with a pulse-shaper being assigned to each sub-area, which shaper in each case converts the same charge amounts of a signal, irrespective of the shape and level of the signal curve generated by the charge amount, into signals of the same level and shape, and in each detector element, at least one sub-area comprising a pulse-shaper with a longer shaping time constant and at least one sub-area comprising a pulse-shaper with a shorter shaping time constant is detected.

During a scan it is possible with at least one embodiment of the method, depending on the current local photon flux through each detector element, to use mainly the measured values for the sub-areas with a shorter shaping time constant when there is a high photon flux and to use the measured values for the sub-areas with a longer shaping time constant when there is a low photon flux in order to generate the total measured value for the detector element.

Furthermore, it is advantageous if, in the case of a changing photon flux during a scan, at least once during the one scan when the rate falls below a predetermined photon flux rate, a calibration of the at least one sub-area that has a lower shaping time constant is carried out with the measured values for the at least one sub-area that has a higher shaping time constant and pertains to the same detector element.

It is also possible during a scan with an alternately changing photon flux for each detector element to carry out a calibration, on each nth minimum in the photon flux, of the at least one sub-area that has a lower shaping time constant with the measured values for the at least one sub-area that has a higher shaping time constant and pertains to the same detector element, where n is a natural number between 1 and the number of readings for the scan in question.

Alternatively, it is also possible during a scan with an alternately changing photon flux for each detector element to determine the deviation, on at least one minimum of the photon flux, between the measured values for the set of sub-areas with a low and a high shaping time constant, and when a predetermined deviation is exceeded, to carry out a calibration of the at least one sub-area that has a lower shaping time constant with the measured values for the at least one sub-area that has a greater time constant and pertains to the same detector element.

FIG. 1 discloses by way of example a diagram of a Dual Source CT system (that is, a CT system with two beam-detector systems) C1, comprising a gantry housing C6, in which two beam-detector systems offset at an angle are attached to the gantry. The beam detector systems include a first X-ray tube C2 having a detector C3 assigned to the first X-ray tube arranged opposite thereto. A further beam-detector system may optionally be arranged on the gantry offset at an angle, said system including a second X-ray tube C4, comprising a detector C5 assigned to the second X-ray tube. In this arrangement, at least one of the two detectors comprises a circuit arrangement according to an embodiment of the invention for the detector elements installed therein. The two beam-detector systems pass over a scanning field located in the central round aperture. Using this scanning field, the patient P can be moved along the system axis C9 with the aid of the patient couch C8. With this arrangement, it is basically possible to carry out both a spiral scan and a sequential scan. To improve the imaging of blood vessels or other structures, the patient may also be injected with contrast, using the contrast applicator C11.

The control of the CT system C1 and the evaluation of the scan on the patient P are carried out by the computer system C10 that is connected thereto, said system having at least one memory, which stores the computer programs Prg1-Prgn. According to an embodiment of the invention, said system also contains or stores programs that are designed such that, when operating the system, they carry out the various configurations of the method according to an embodiment of the invention.

If the measured values provided by a detector element or an individual beam are considered, then it is not hard to recognize from the rotation of the beam-detector system that these measured values constantly vary by a considerable amount during a rotation round the scanned subject (at least in the case of scanned subjects that are not configured in a rotation-symmetrical manner nor arranged coaxially to the system axis).

FIG. 2 shows the curve of values over a plurality of revolutions for an example beam or an exemplary detector element in a sinogram, with the ordinate showing the count rate for the impulses and the abscissa showing the angle of rotation of the gantry. During a scan, areas of high and low absorption and thus with low and high count rates are scanned. The ideal (for instance, sinusoidal) curve is shown by the reference mark 1. In the event of a pulse-shaper being used, the long shaping time constant (that is, the period for which an individual original impulse is measured in order to be subsequently emitted in a predetermined pulse form) influences the measurement characteristics of a detector element. The scenario for a relatively short shaping time constant is shown by way of example by curve 2, where the artificial pulse width amounts to about 1.5 times the intrinsic pulse width. As an example of a longer shaping time constant, curve 3 shows the count rate obtained at a 5 times greater shaping time constant in relation to the intrinsic pulse width.

As can be seen, at higher pulse rates, a short shaping time constant therefore leads to the measured value curve 2 being more closely aligned with the actual value curve 1. At the same time, however, at lower pulse rates, this short shaping time constant leads to a drift away from the actual values, as shown by the dotted lines. On the other hand, if curve 2 for the measured values with a long shaping time constant is considered, then considerably less drift can be seen. In order to illustrate this more clearly, detail A from FIG. 2 in the region of the penultimate minimum for the measured values is shown again in FIG. 3.

FIG. 4 discloses an example embodiment of a multi-line detector C3, depicted by way of example in one plane, the detector including a plurality of detector elements D, shown here as small squares.

Moreover, according to an embodiment of the invention, the individual detector elements are intended to include a plurality of sub-areas, wherein at least one sub-area comprises a pulse-shaper that has a shorter shaping time constant and at least one sub-area comprises a pulse-shaper that has a longer shaping time constant. Examples of this embodiment are shown in FIGS. 5 to 12, which show in each case a detector element D with non-hatched and hatched sub-areas. The hatched sub-areas are intended to show sub-areas with a circuit arrangement pertaining thereto that have a relatively short shaping time constant and the non-hatched sub-areas are intended to show sub-areas that have a relatively long shaping time constant.

By using at least two sub-areas having different shaping time constants, the following advantages become apparent:

a) As a result of the longer shaping time, the count rate drift in a low flux can be virtually eliminated.

b) There is a good energy resolution as a result of low-noise electronics in the region with a low count rate, which is important for image generation and a high dual-energy contrast.

c) Low thresholds can be set in the event of a low flux, resulting in an improved signal/noise-ratio.

d) There is the option of correcting drift for the faster cell within a scan, that is, for high flux.

e) There is low power consumption or heat generation in the slow cell and therefore a good capacity for integration.

Figure 5:
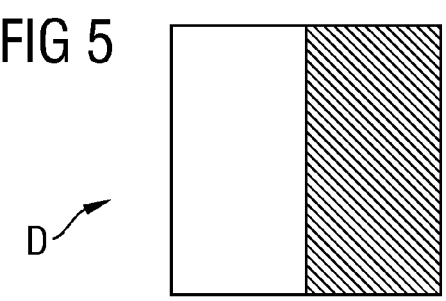
Figure 6:
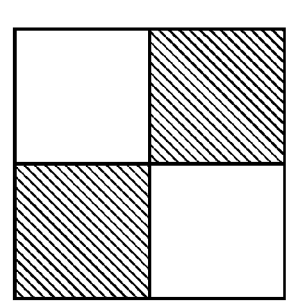
Figure 7:
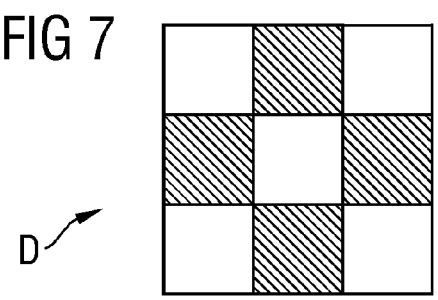
Figure 8:
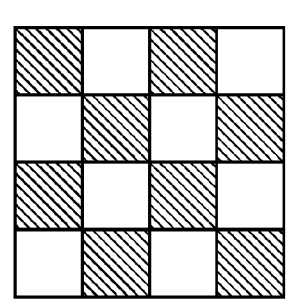
Figure 9:
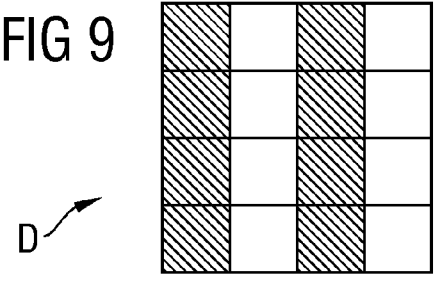
Figure 10:
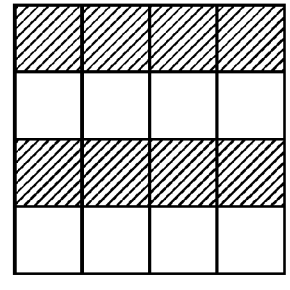
Figure 11:
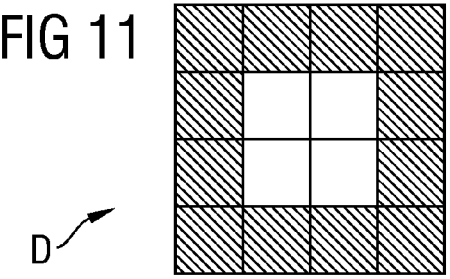
Figure 12:
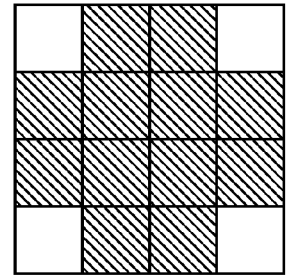

FIG. 13 shows by way of example a process sequence according to an embodiment of the invention for the recording of measured values by a detector element D comprising sub-areas subdivided according to FIG. 5.

Captions to FIG. 13

$S_{1.1}$ signal amplification
$S_{1.2}$ signal-shaping with a shorter shaping time constant
$S_{1.3}$ signal-counting
$S_{1.4}$ correction
$S_{2.1}$ signal amplification
$S_{2.2}$ signal-shaping with a longer shaping time constant
$S_{2.3}$ signal-counting
$S_3$ signal-combination and calibration
$S_4$ output of the measured value From the sub-area T1, which is intended to represent the directly converting semi-conductor surface of the detector element, a signal amplification is carried out in step S1.1. There then ensues in step S1.2 a signal-shaping using a relatively short shaping time constant, preferably in the region of 1-2 times the intrinsic pulse width. These shaped signals are counted in step S1.3 and then in step S1.4 extensively corrected to match the real photon flux using a correcting element and further transmitted to the signal conversion step S3. In parallel to the above operation, a corresponding processing of the signals from the sub-area T2 is carried out via the corresponding steps S2.1 to S2.3 or S3.

According to an embodiment of the invention, at low count rates a calibration of the correcting element is carried out in step S3 in each case by influencing the correction element in step S1.4, for the sub-area or sub-areas having a short shaping time constant, the calibration being based on a comparison of the measured values for sub-areas having a short or long shaping time constant. As a result thereof, the values for the sub-areas having a long shaping time constant are assumed to be closer to the actual values. For the output of the signal, it possible in the signal combination step S3, for example, for a mean value to be derived from the signals for the sub-areas. Finally, the output of the measured values ensues in step S4.

FIG. 14 shows by way of example an embodiment of the circuit electronics of a counting detector comprising detector elements D subdivided into sub-areas T1, T2, each element being read off with a different shaping time constant. According to an embodiment of the invention, the count impulses for the sub-areas T1 or T2 coming from the detector are in each case transmitted to the electronic counting unit I or II with a pulse-shaper S with an amplifier V connected downstream, wherein the pulse-shaper S for the sub-areas T1 or the electronic counting unit I has a lower shaping time constant than the pulse-shaper S for the sub-areas T2 or the electronic counting unit II. The shaped and amplified signals are subsequently transmitted in parallel to a continuous pulse-height discriminator (=counter) K or to a pulsed pulse-height discriminator (=counter) T. The outputs from the continuous pulse-height discriminator K or from the pulsed pulse-height discriminator T are then combined via a logic element L, such that a common count result E that is as linear as possible is produced in the result.

As an alternative to the sub-division of the detector elements into sub-areas that is shown in FIG. 14, it is also possible, as shown in FIG. 15, starting with a total area of a detector element D, for the count signals to be further transmitted in parallel to two detector electronics assemblies I or II with different shaping time constants and to be processed separately there. This also leads to two measurement paths being created in parallel for each detector element D. In the region with a low count rate the counter readings for both pathways then have to be the same, the counter reading for the fast counter being equated with the counter reading for the slow counter in order to carry out a calibration in the event of deviations.

In total, therefore, at least one embodiment of the present invention discloses a circuit arrangement for a detector comprising directly converting semi-conductor material and a pulse-shaper in the signal-reading measurement electronics assembly and a method for reading the count impulses generated in the semi-conductor material, wherein part of the pulse-shaper is equipped with a longer shaping time constant and a different part of the pulse-shaper is equipped with a shorter shaping time constant.

Of course, the features of the invention referred to in the aforementioned embodiments are not only applicable in the combination described in each case, but also in other combinations or alone, without going beyond the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit arrangement for a detector for ionizing radiation, comprising:
   a plurality of radiation-sensitive sub-areas, each including
      a directly converting semi-conductor material provided as a radiation-sensitive material; and
   a plurality of dedicated readout electronics assemblies, each assigned to a respective one of the plurality of radiation-sensitive sub-areas, to individually read each respective one of the plurality of radiation-sensitive sub-areas, each of the plurality of dedicated readout electronics assemblies including at least one pulse-shaper, one part of the sub-areas being equipped exclusively with pulse-shapers including a relatively longer shaping time constant and a different part of the sub-areas being equipped exclusively with pulse-shapers including a relatively shorter shaping time constant, the relatively shorter shaping time constant being shorter than the relatively longer shaping time constant.

2. The circuit arrangement of claim 1, wherein a plurality of detector elements distributed over a two-dimensional surface of the detector are provided, each of the plurality of detector elements being configured to measure a beam, and each of the plurality of detector elements being subdivided into at least two radiation-sensitive sub-areas, wherein at least one of the at least two sub-areas within each detector element is equipped with a pulse-shaper including a relatively longer shaping time constant and at least one other of the at least two sub-areas is equipped with a pulse-shaper including a relatively shorter shaping time constant.

3. The circuit arrangement of claim 2, wherein a number of the plurality of radiation-sensitive sub-areas including a relatively long shaping time constant is equal to a number of the plurality of radiation-sensitive sub-areas including a relatively short shaping time constant.

4. The circuit arrangement of claim 2, wherein all of the detector elements are of equal size.

5. The circuit arrangement of claim 1, wherein all of the plurality of radiation-sensitive sub-areas are of equal size.

6. The circuit arrangement of claim 1, wherein output signals received from the detector material are transmitted to a respective at least one pulse-shaper via an amplification step.

7. The circuit arrangement of claim 1, wherein at least one respective discrete counter is arranged downstream of the at least one respective pulse-shaper.

8. The circuit arrangement of claim 1, wherein all measured value outputs from the plurality of radiation-sensitive sub-areas that include a relatively short shaping time constant and all the measured value outputs from the plurality of radiation-sensitive sub-areas that include a relatively long shaping time constant are combined and added together for each respective detector element.

9. The circuit arrangement of claim 1, wherein the plurality of radiation-sensitive sub-areas form individual detector elements, wherein each of the individual detector elements is configured to measure a beam or wherein each of the individual detector elements is connected to at least one pulse-shaper including a relatively longer shaping time constant and to at least one pulse-shaper including a relatively shorter shaping time constant.

10. A method, comprising:
using the circuit arrangement as claimed in claim 1 in a detector of a CT system wherein, during a scan, depending on a current local photon flux through each of the detector elements, measured values for the sub-areas with a relatively shorter shaping time constant are predominantly used when there is a relatively high photon flux and when there is a relatively low photon flux, measured values for the sub-areas with a relatively longer shaping time constant are used to derive a total measured value for the detector element.

11. The circuit arrangement of claim 1, wherein the circuit arrangement is for a detector in a CT system.

12. A detector comprising the circuit arrangement of claim 1.

13. A CT system comprising the detector of claim 12.

14. A method, comprising:
using the circuit arrangement as claimed in claim 1 in a detector of a CT system wherein, wherein, in case of a changing photon flux during a scan, at least once during the scan, when a photon flux rate falls below a threshold rate, a calibration of the at least one sub-area including the relatively lower shaping time constant is carried out with measured values for the at least one sub-area including the relatively higher shaping time constant and pertains to the same detector element.

15. A method, comprising:
using the circuit arrangement as claimed in claim 1 in a detector of a CT system wherein, wherein, during a scan with an alternately changing photon flux for each detector element, on at least one minimum of the photon flux, a deviation between measured values for the set of sub-areas including the relatively low and the set of sub-areas including the relatively high shaping time constant is determined, and when a threshold deviation is exceeded, a calibration of the at least one sub-area including the relatively lower shaping time constant with the measured values for the at least one sub-area including the relatively greater time constant and pertains to the same detector element is carried out.

16. A method, comprising:
using the circuit arrangement as claimed in claim 1 in a detector of a CT system wherein, wherein, during a scan with an alternately changing photon flux for each detector element, a calibration is carried out, on each nth minimum of the photon flux, of the at least one sub-area including the relatively lower shaping time constant with the measured values for the at least one sub-area including the relatively higher shaping time constant and pertains to the same detector element, where n is a natural number between 1 and the number of readings for the scan.

17. A method for detector elements, pertaining to a directly converting detector for ionizing radiation, the method comprising:
dividing up each of the detector elements into at least two separately detectable sub-areas; and
assigning a dedicated measurement electronics assembly comprising a pulse-shaper to each of the at least two separately detectable sub-areas such that each of the at least two separately detectable sub-areas has a separate dedicated measurement electronics assembly, each of the pulse-shapers being configured to convert an equal charge amount of a signal, irrespective of a shape and height of a signal curve generated by the charge amount, into signals of a same level and shape, and at least one of the at least two separately detectable sub-areas of each of the detector elements being assigned a pulse-shaper including a relatively longer shaping time constant and at least one other at least two separately detectable sub-areas of each of the detector elements being assigned a pulse-shaper including a relatively shorter shaping time constant is detected, the relatively shorter shaping time constant being shorter than the relatively longer shaping time constant.

18. The method of claim 17, wherein, during a scan, depending on a current local photon flux through each of the detector elements, measured values for the sub-areas with a relatively shorter shaping time constant are predominantly used when there is a relatively high photon flux and when there is a relatively low photon flux, measured values for the sub-areas with a relatively longer shaping time constant are used to derive a total measured value for the detector element.

19. The method of claim 18, wherein, in case of a changing photon flux during a scan, at least once during the scan, when a photon flux rate falls below a threshold rate, a calibration of the at least one sub-area including the relatively lower shaping time constant is carried out with measured values for the at least one sub-area including the relatively higher shaping time constant and pertains to the same detector element.

20. The method of claim 18, wherein, during a scan with an alternately changing photon flux for each detector element, a calibration is carried out, on each nth minimum of the photon flux, of the at least one sub-area including the relatively lower shaping time constant with the measured values for the at least one sub-area including the relatively higher shaping time constant and pertains to the same detector element, where n is a natural number between 1 and the number of readings for the scan.

21. The method of claim 18, wherein, during a scan with an alternately changing photon flux for each detector element, on at least one minimum of the photon flux, a deviation between measured values for the set of sub-areas including the relatively low and the set of sub-areas including the relatively high shaping time constant is determined, and when a threshold deviation is exceeded, a calibration of the at least one sub-area including the relatively lower shaping time constant with the measured values for the at least one sub-area including the relatively greater time constant and pertains to the same detector element is carried out.

22. The method of claim 17, wherein, in case of a changing photon flux during a scan, at least once during the scan, when a photon flux rate falls below a threshold rate, a calibration of the at least one sub-area including the relatively lower shaping time constant is carried out with measured values for the at least one sub-area including the relatively higher shaping time constant and pertains to the same detector element.

23. The method of claim 17, wherein, during a scan with an alternately changing photon flux for each detector element, a calibration is carried out, on each nth minimum of the photon flux, of the at least one sub-area including the relatively lower shaping time constant with the measured values for the at least one sub-area including the relatively higher shaping time constant and pertains to the same detector element, where n is a natural number between 1 and the number of readings for the scan.

24. The method of claim 17, wherein, during a scan with an alternately changing photon flux for each detector element, on at least one minimum of the photon flux, a deviation between measured values for the set of sub-areas including the relatively low and the set of sub-areas including the relatively high shaping time constant is determined, and when a threshold deviation is exceeded, a calibration of the at least one sub-area including the relatively lower shaping time constant with the measured values for the at least one sub-area including the relatively greater time constant and pertains to the same detector element is carried out.

25. A non-transitory computer readable medium including program segments for, when executed on a computer device, causing the computer device to implement the method of claim 17.

26. A detector, comprising:
a plurality of detector elements distributed over a two-dimensional surface of the detector, each of the plurality of detector elements being configured to measure a beam, and each of the plurality of detector elements being subdivided into at least two radiation-sensitive sub-areas, at least one of the at least two radiation-sensitive sub-areas within each of the plurality of detector elements being equipped exclusively with a pulse-shaper including a relatively longer shaping time constant and at least one other of the at least two radiation-sensitive sub-areas being equipped exclusively with a pulse-shaper including a relatively shorter shaping time constant, the relatively shorter shaping time constant being shorter than the relatively longer shaping time constant.

27. The detector of claim 26, wherein a number of the plurality of radiation-sensitive sub-areas including a relatively long shaping time constant is equal to a number of the plurality of radiation-sensitive sub-areas including a relatively short shaping time constant.

28. The detector of claim 26, wherein all of the plurality of radiation-sensitive sub-areas are of equal size.

29. The detector of claim 26, wherein all of the detector elements are of equal size.

30. The detector of claim 26, wherein output signals received from the detector material are transmitted to a respective at least one pulse-shaper via an amplification step.

31. The detector of claim 26, wherein at least one respective discrete counter is arranged downstream of the at least one respective pulse-shaper.

32. The detector of claim 26, wherein all measured value outputs from the plurality of radiation-sensitive sub-areas that include a relatively short shaping time constant and all the measured value outputs from the plurality of radiation-sensitive sub-areas that include a relatively long shaping time constant are combined and added together for each respective detector element.

33. A CT system comprising the detector of claim 26.

* * * * *